Jan. 9, 1934. J. BECH 1,942,994
CAN CUTTING DEVICE
Filed July 23, 1932 5 Sheets-Sheet 2
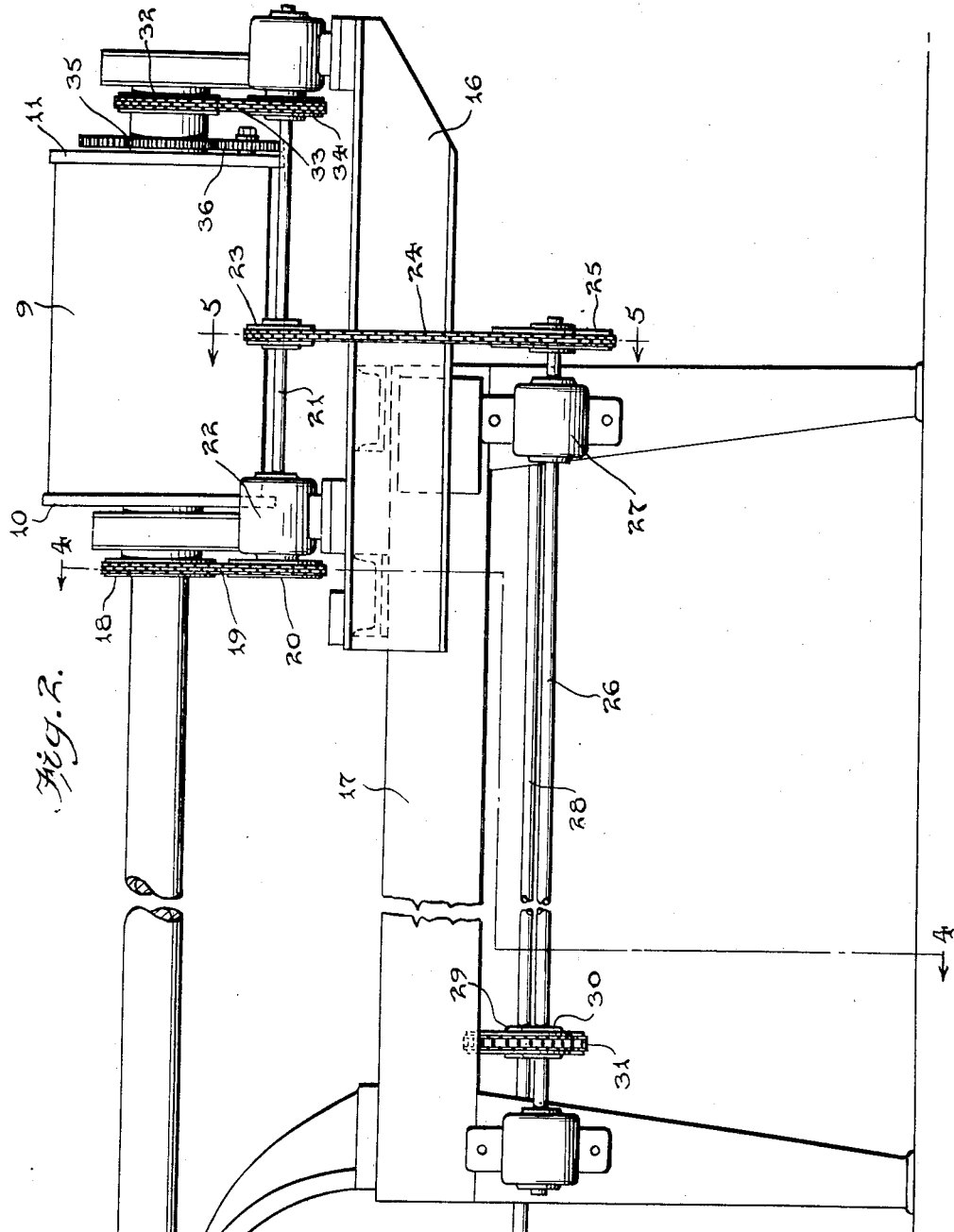
Inventor
Joseph Bech
Attorney Jan. 9, 1934.  J. BECH  1,942,994
CAN CUTTING DEVICE
Filed July 23, 1932   5 Sheets-Sheet 3
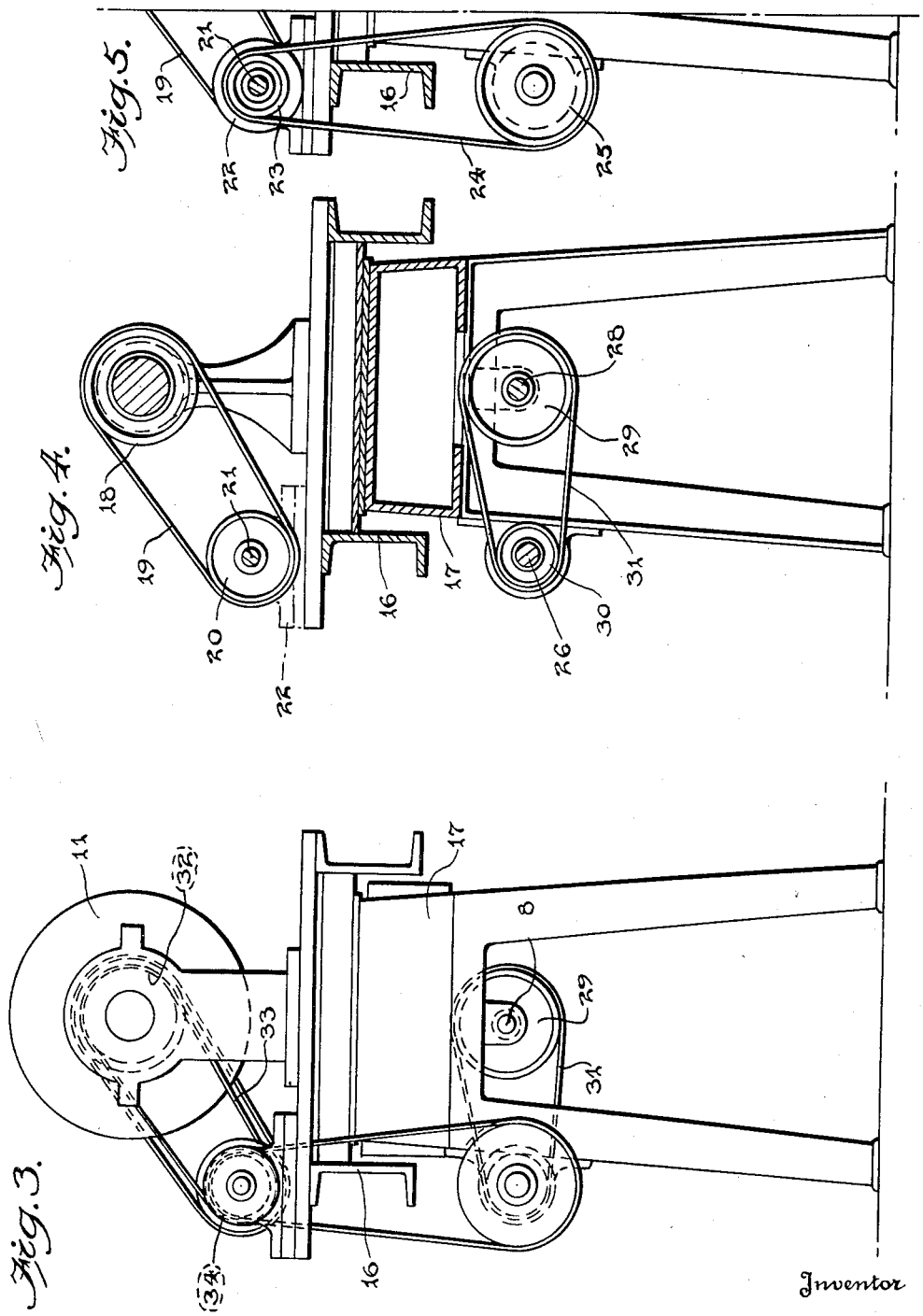
Inventor
Joseph Bech
By George W. Johns
Attorney

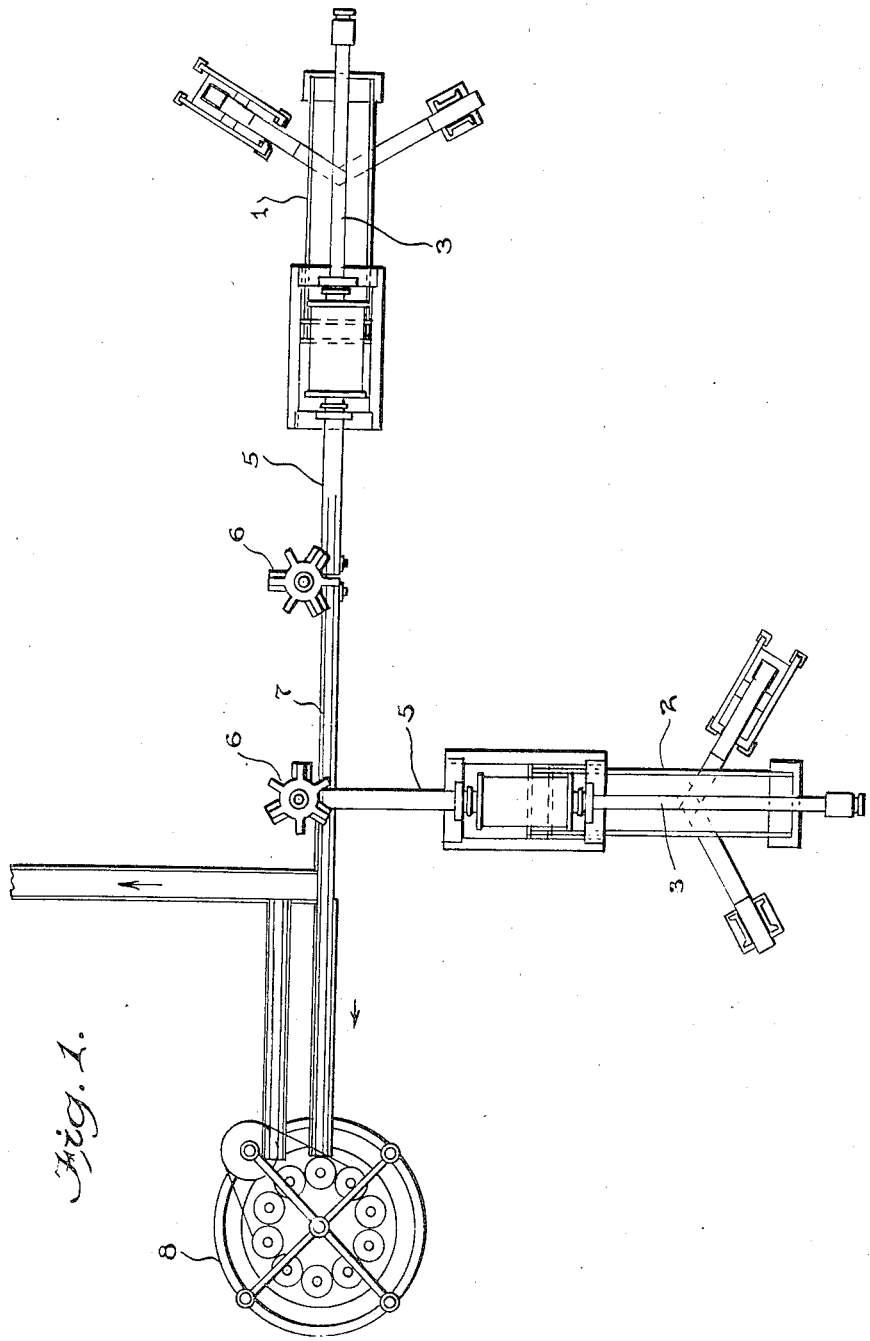

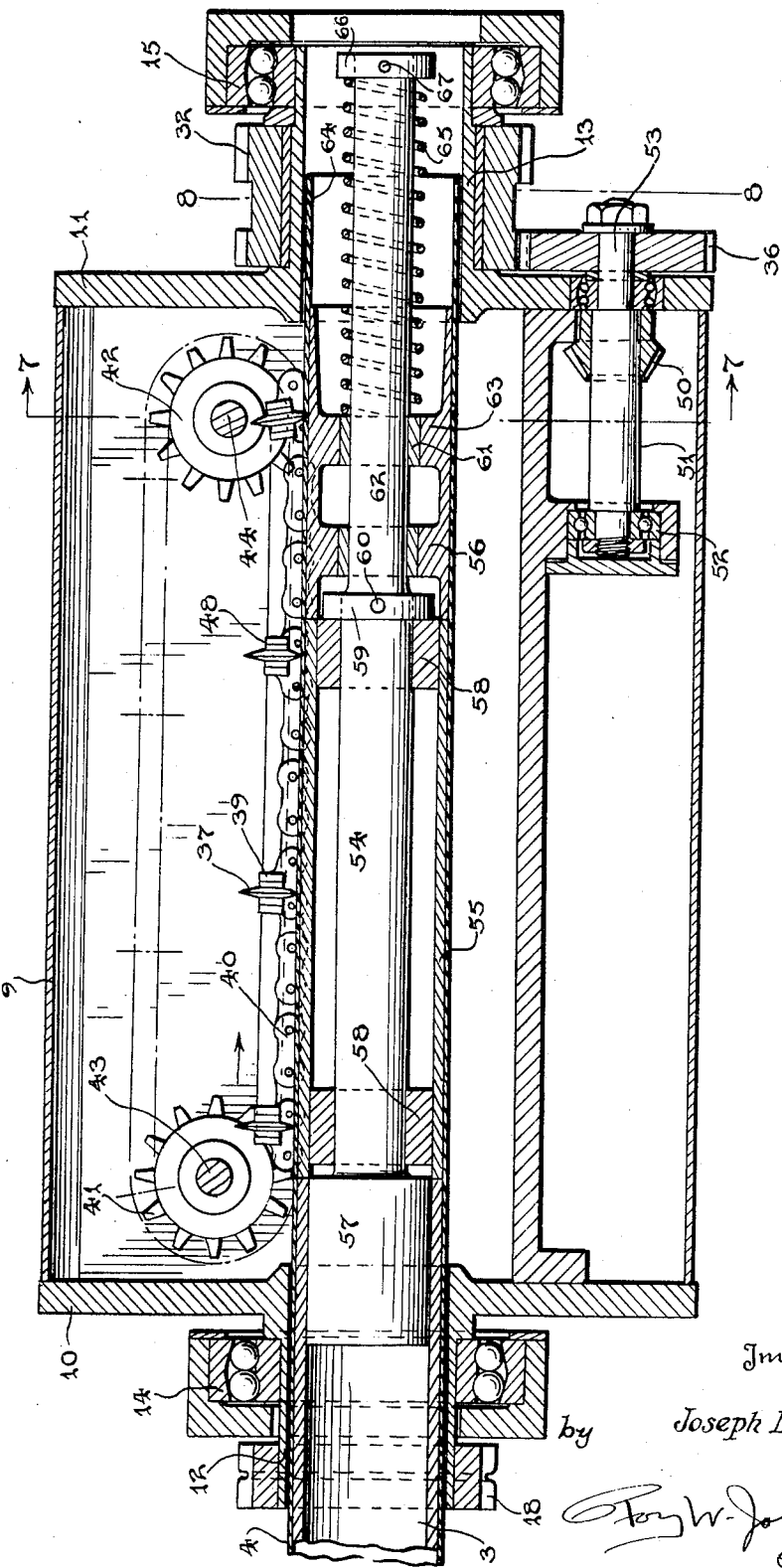

Jan. 9, 1934.   J. BECH   1,942,994
CAN CUTTING DEVICE
Filed July 23, 1932   5 Sheets-Sheet 5

Inventor
Joseph Bech
By
George W. Johns
Attorney

Patented Jan. 9, 1934

1,942,994

UNITED STATES PATENT OFFICE 1,942,994

CAN CUTTING DEVICE

Joseph Bech, Chicago, Ill., assignor to Industrial Patents Corporation, Chicago, Ill., a corporation of Delaware Application July 23, 1932. Serial No. 624,192

17 Claims. (Cl. 164—61)

The invention relates to an automatic paper can cutting device.

The object of the present invention is to provide a simple, practical and efficient automatic paper can cutting device of strong, durable and comparatively inexpensive construction designed to be applied to continuous spirally wound paper tube forming machines and adapted particularly for use in connection with the manufacture of paper cans having the customary metal ends.

A further object of the invention is to provide an automatic paper can cutting device of this character equipped with cutting mechanism adapted to travel with a continuous fiber tube in the longitudinal movement thereof and capable also of revolving around the tube in a direction opposite to the direction in which the fiber tube rotates and of gradually penetrating the tube and of effecting a clean cutting while traveling the length of each severed portion of the tube.

Another object of the invention is to provide means for affording a firm support to the tube during the final cutting operation and of preventing injury to or dulling of the cutters through contact with such surface.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Fig. 1 is a diagrammatic plan view showing a general layout of factory equipment for the manufacture of paper cans and illustrating the arrangement of the automatic cutting device with relation to the paper tube forming machines.

Fig. 2 is a side elevation of a paper forming machine provided with an automatic cutting device constructed in accordance with this invention.

Fig. 3 is an end elevation of the same.

Fig. 4 is a transverse sectional view taken on the line 4—4 of Fig. 2.

Fig. 5 is a similar view taken on the line 5—5 of Fig. 2.

Fig. 6 is a longitudinal sectional view of the automatic paper can cutting device.

Figure 7:
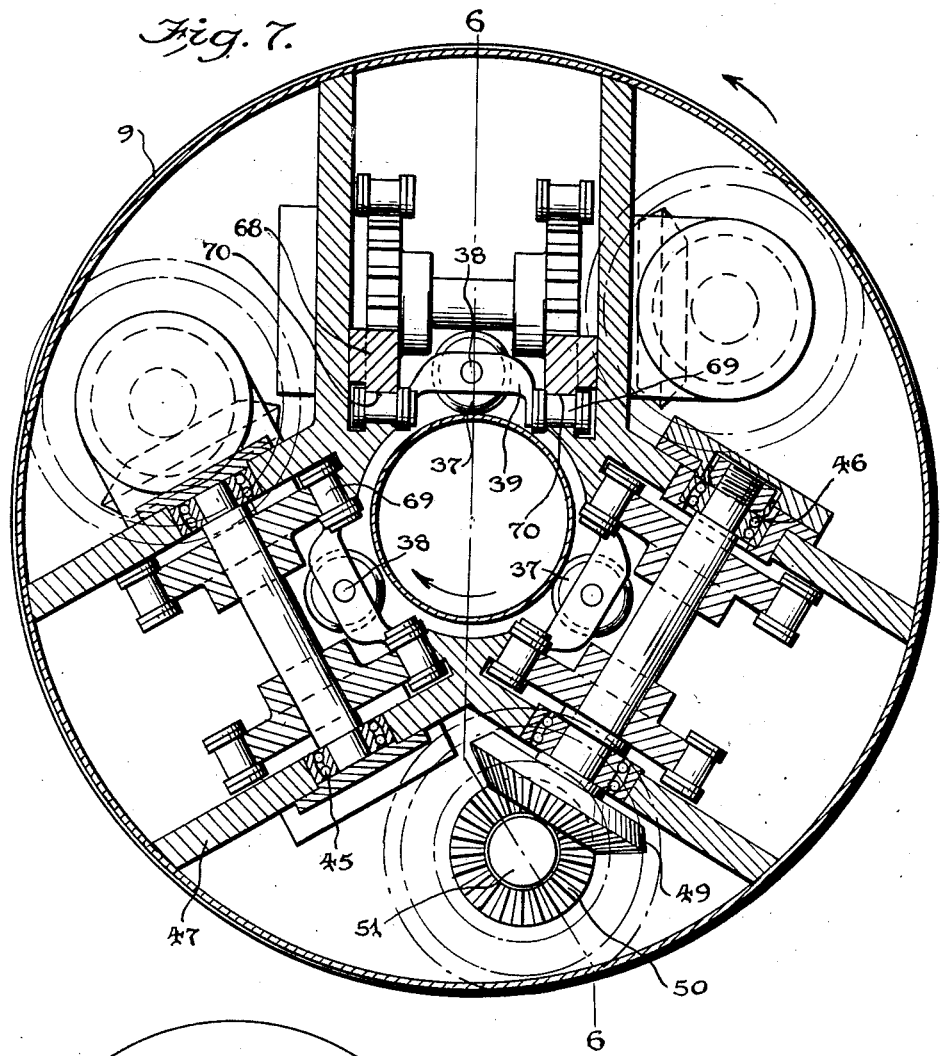
Fig. 7 is a transverse sectional view of the same taken on the line 7—7 of Fig. 6.
Figure 8:
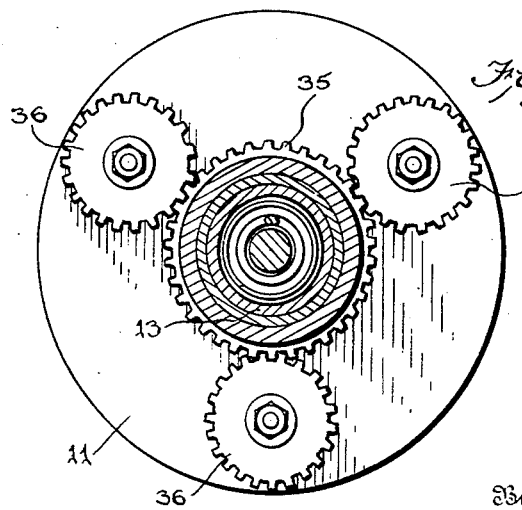
Fig. 8 is a transverse sectional view taken on the line 8—8 of Fig. 6.

In the accompanying drawings in which is illustrated the preferred embodiment of the invention the automatic paper can cutting device 60 is shown applied in Fig. 1 to a plurality of continuous spirally wound paper tube forming machines 1 and 2 each having a winding mandrel which delivers the paper or fiber tube 4 to the automatic paper can cutting device. The continuous paper or fiber tube 4 is cut into equal lengths by the automatic paper can cutting device to form the body portions of the cans and the severed portions of the tube are carried from the automatic can cutting devices by suitable conveyor means 5 to a star wheel device 6 which places each individual can body in an upright position on a conveyor belt 7. The conveyor belt transfers the can bodies to a crimping machine 8 in which suitable metal ends are placed upon the can bodies. As the paper tube forming machines, the conveyor means, the star wheels and the crimping machine are all well known constructions, further illustration and description thereof are deemed unnecessary.

The automatic paper can cutting device comprises in its construction a housing consisting of a cylindrical shell 9 and end plates 10 and 11 provided with integral trunnions 12 and 13 rotatably mounted in ball bearings 14 and 15 through the medium of which the entire automatic paper can cutting device may be rotated. The ball bearings are carried by a suitable auxiliary frame 16 which is mounted on the frame 17 of the paper tube forming machine, as clearly illustrated in Figs. 2 and 3 of the drawings, but the supporting frame for the paper tube forming machine and the automatic paper can cutting device may be of any desired construction, as will be readily understood.

The trunnion 12 has fixedly mounted on it a sprocket wheel 18 which is connected by a sprocket chain 19 with a sprocket wheel 20 fixed to a horizontal line shaft 21. The line shaft 21 which is mounted in suitable bearings 22 has keyed or otherwise secured to it a sprocket wheel 23 which is connected by a sprocket chain 24 with a sprocket wheel 25 fixedly mounted on a drive shaft 26 journaled in suitable bearings 27 of the supporting frame of the paper tube forming machine. The chain drive from the drive shaft 26 to the line shaft 21 is located intermediate of the ends of the latter and the drive shaft 26 is connected by sprocket gearings or other suitable means with a power shaft 28 adapted to receive power from any suitable source and from which power is taken for operating the paper tube forming machine. The chain drive from the power shaft to the drive shaft 26 comprises sprocket wheels 29 and 30 and a sprocket chain 31. The sprocket wheels 29 and 30 are mounted respectively on the power shaft 28 and the drive shaft 26, as clearly illustrated in Fig. 4 of the drawings. The chain drive from the power shaft to the drive shaft is approximately horizontal while the chain drive from the power shaft to the line shaft 21 is approximately vertical, as clearly illustrated in Fig. 5 of the drawings.

The trunnion 13 has rotatably mounted on it a sprocket wheel 32 which is connected by a sprocket chain 33 with a sprocket wheel 34 fixedly mounted on the line shaft 21. The sprocket wheel 32 is provided with an integral spur gear 35 which meshes with three spur gears 36 which are connected with three cutting units of the automatic paper can cutting device. The line shaft 21 is connected at one end with the automatic paper can cutting device and at the other end with the cutting units of the can cutting device whereby the can cutting device is rotated and the cutting units are simultaneously operated.

The cutting units of the automatic paper can cutting device are arranged within the cylindrical housing of the said device and are disposed 120° apart, as clearly illustrated in Fig. 7 of the drawings. Each cutting unit comprises sharp edged steel disks 37 mounted on pins 38 which are carried by bridges 39 arranged at regular intervals and connected at their ends to links of endless sprocket chains 40 disposed in pairs and arranged on sprocket wheels 41 and 42. The sprocket wheels 41 and 42 are mounted on transverse shafts 43 and 44 which are journaled in ball bearings 45 and 46 of suitable framework 47 arranged within the housing of the automatic paper can cutting device and connected integrally or otherwise with the end plates 10 and 11. The framework is preferably provided with spaced parallel side members disposed in pairs and located at opposite sides of the cutting units, as clearly illustrated in Fig. 7 of the drawings. Any other suitable construction of supporting framework may, of course, be employed. The bridges 39 which are preferably arched, as illustrated in Fig. 6 of the drawings, have spaced sides forming intervening spaces or openings 48 to receive the cutting knives 37 which revolve around the paper or fiber tube 4 and which also travel with the tube during the cutting operation.

The transverse shaft 44 has mounted upon one end of it a bevel gear 49 which meshes with a bevel gear 50 of a short longitudinal shaft 51 journaled in ball bearings 52 of the framework of the automatic cutting device and extended at one end through the end plate 11 and having one of the spur gears 36 mounted on its extended portion 53.

Each of the three cutting units is connected with one of the spur gear wheels 36 by means of the bevel gears 49 and 50 on the shaft 51 whereby the three cutting units will be simultaneously operated from the line shaft 21.

The automatic paper can cutting device receives the outer end portion of the winding mandrel 3, as clearly illustrated in Fig. 6 of the drawings, and the said mandrel is spaced from the central longitudinal opening of the trunnions 12 and 13 a sufficient distance to provide an intervening space between the paper or fiber tube 4 and the trunnions to permit the tube to slide freely in a longitudinal direction through the automatic paper can cutting device. The winding mandrel 3 extends into the automatic paper can cutting device a short distance and is provided with a shaft or stem 54 which supports a relatively stationary mandrel 55 and a slidable mandrel 56. The mandrel 55 forms a continuation of the winding mandrel 3 and with the slidable mandrel 56 supports the paper tube during the cutting operation. The stem 54 is provided at its inner end with a cylindrical head 57 which is suitably secured within the outer end of the winding mandrel 3 whereby the stem 54 is supported by the mandrel 3. The stem 54 is of less diameter than the mandrels 55 and 56 and bushings 58 are arranged upon the inner portion of the stem for supporting the mandrel 55 at the ends thereof, as clearly illustrated in Fig. 6 of the drawings. The bushings are preferably fixed within the mandrel 55 and the latter is held against longitudinal movement on the stem by means of a collar 59 secured to the stem by a pin 60 or other suitable fastening means.

The stem 54 is slightly reduced beyond the collar 59 and bushings 61 are interposed between the outer portion 62 of the stem and internal annular enlargements 63 of the slidable mandrel 56. The slidable mandrel 56 is constructed of suitable soft metal of a character to permit the cutting knives to entirely sever can sections 64 from the paper tube and contact with the slidable mandrel without dulling or otherwise injuring the cutting edges of the knives. The bushings 61 are suitably fixed to the enlargements 63 so that the bushings and the mandrel 56 slide together along the outer portion of the shaft or stem and the slidable mandrel 56 is normally maintained at the limit of its inward movement by a coiled spring 65 disposed on the outer portion 62 of the shaft or stem 54 and interposed between a collar 66 of the shaft and the outer bushing of the slidable mandrel. The collar 66 is secured by a pin 67 or other suitable fastening device to the outer end of the shaft 54.

The cutting knives are spaced apart a distance equal to the length of the can bodies or sections severed from the paper tube and as the cutting knives travel from one sprocket wheel to the other they are brought into engagement with the paper tube and after cutting off a section of the same they are lifted or moved outwardly from the mandrel 56 where the final cutting operation occurs. The trunnions 12 and 13 form the central opening through the automatic paper can cutting device for the passage of the paper tube and in the operation of the cutting device the knives are carried around the tube at a rapid rate at the same time they are advanced with the tube.

This rapid rotary motion of the knives around the tube produces a cleaner and better cutting of the tube than can be obtained with stationary cutting elements depending only for their cutting action on the rather slow rotation of the tube. The paper tube rotates in the direction of the arrow at the center of Fig. 7 of the drawings and the rapid rotation or revolution of the cutting elements around the exterior of the paper tube is in the direction of the arrow at the other portion of Fig. 7 of the drawings. The chains 40 are of such a length as to be divided into an integer of equal lengths, each length being equal to the desired length of the severed can body.

The chains are restrained from motion in an outward direction with reference to the center of the apparatus as a whole by guiding means consisting of tracks 68 which are engaged by rollers 69 of the endless chains. The tracks which maintain the knives in cutting engagement with the tube present to the said rollers 69 track faces 70 which are not truly parallel to the axis of the mandrel 55, but converge and approach the center of the apparatus closer at the discharge end of the machine than at the inner or feeding end. This allows the cutting knives 37 to engage gently the paper tube 4 at a point substantially in the plane of the axis of the sprocket wheels 41 and then to cut deeper and deeper into the tube as they move away from such point in the direction of the arrow in Fig. 6 of the drawings.

Previous to the time when the cutting knives have moved to a point substantially in the plane of the axis of the sprocket wheels 42 the paper tube 4 has been completely cut through and the upward movement of the knives in traveling around the sprocket wheels 44 from the lower flights of the chains to the upper flights thereof the cutting knives are disengaged from the tube. The mandrels 55 and 56 provide a solid cutting surface against which the cutting element may react and for the purpose of providing for a clean cutting of the tube 4 the mandrel 56 is arranged to slide longitudinally upon the shaft extension 62 of the relatively fixed mandrel 55. The soft metal of the slidable mandrel 56 will not dull the cutting knives as they become engaged with it. As the cutting knives move towards the discharge end of the machine they are forced by the inclined outwardly converging tracks into engagement with the mandrel 56 and as they approach engagement with the mandrel 56 they cut through the paper tube and engage the mandrel 56 and cause the same to move with them outwardly towards the discharge end of the cutting device. The slidable mounting of the mandrel 56 and the coiled spring 65 permit this operation. As soon as the cutters are carried out of engagement with the mandrel 56 by passing around the sprocket wheels 42 the released mandrel 56 is returned to its extreme left hand position by the action of the spring 65. This sliding movement of the mandrel 56 enables a smooth clean cutting of the continuous paper tube to be made as the cutting knives travel longitudinally of the machine with the paper tube so that there is no relative longitudinal movement between the cutting knives and the paper tube. Also during this cutting operation a solid cutting surface is afforded by the slidable mandrel.

The longitudinal movement of the chain and the cutters is approximately equal to the speed of the paper tube. Preferably the chains and the cutters should travel slightly faster than the tube. This difference in velocity between the longitudinal movement of the cutters and the longitudinal movement of the paper tube may be compensated for by any suitable friction clutch driving device placed at any suitable point in the driving system. For example, the sprocket wheel 34 may be connected with the shaft 21 by means of a friction clutch which may be adjusted to provide slipping movement when the pressure between the cutters 37 and the tube 4 reaches a predetermined value. Any other suitable means may, of course, be employed for accomplishing this result which will always positively assure the longitudinal travel of the cutting knives being as rapid as the longitudinal movement of the paper tube. This with the sliding motion of the mandrel will insure a perfect cutting of the paper tube.

What is claimed is:

1. An automatic paper can cutting device for continuous paper tube forming machine including a plurality of cutting elements arranged to engage a paper tube exteriorly thereof at spaced points around the same, means for revolving the cutting elements around the tube for cutting the latter, and means for simultaneously moving the cutting elements longitudinally of the cutting device to cause the cutting elements to travel with the tube during the cutting operation.

2. An automatic paper can cutting device for continuous paper tube forming machines including cutting units arranged at spaced points around a tube and having cutting knives arranged to engage the tube exteriorly thereof at intervals along the same, and means for revolving the cutting units around the tube to cut the same.

3. An automatic paper can cutting device for continuous paper tube forming machines including cutting units arranged at spaced points around a tube and having cutting knives arranged to engage the tube exteriorly thereof at intervals along the same, means for revolving the cutting units around the tube to cut the same, and means for moving the cutting knives longitudinally of the cutting device to cause the knives to travel with the tube during the cutting operation.

4. An automatic paper can cutting device for continuous paper tube forming machines including a plurality of cutting elements arranged to engage a paper tube exteriorly thereof at spaced points around the same, means for revolving the cutting elements around the tube for cutting the latter, means for simultaneously moving the cutting elements longitudinally of the cutting device to cause the cutting elements to travel with the tube during the cutting operation, and means for moving the cutting elements inwardly with relation to the tube to cause a gradual penetration of the cutting elements into the tube.

5. An automatic paper can cutting device for continuous paper tube forming machines including cutting units arranged at spaced points around a tube and having cutting knives arranged to engage the tube exteriorly thereof at intervals along the same, means for revolving the cutting units around the tube to cut the same, means for moving the cutting knives longitudinally of the cutting device to cause the knives to travel with the tube during the cutting operation, and means for moving the cutting elements inwardly to cause a gradual penetration of the cutting elements into the tube.

6. An automatic paper can cutting device for continuous paper tube forming machines including a plurality of cutting elements arranged to engage a paper tube exteriorly thereof at spaced points around the same, means for revolving the cutting elements around the tube for cutting the latter, means for simultaneously moving the cutting elements longitudinally of the cutting device to cause the cutting elements to travel with the tube during the cutting operation, and guiding means for the cutting elements converging longitudinally of the cutting device for causing gradual penetration of the cutting elements into the tube.

7. An automatic paper can cutting device for continuous paper tube forming machines including a plurality of cutting elements arranged to engage a paper tube exteriorly thereof at spaced points around the same, means for revolving the cutting elements around the tube for cutting the latter, means for simultaneously moving the cutting elements longitudinally of the cutting device to cause the cutting elements to travel with the tube during the cutting operation and longitudinally movable means arranged interiorly of the tube and forming a cutting surface for the cutting elements.

8. An automatic paper can cutting device for continuous paper tube forming machines including a plurality of cutting elements arranged to engage a paper tube exteriorly thereof at spaced points around the same, means for revolving the cutting elements around the tube for cutting the latter, means for simultaneously moving the cutting elements longitudinally of the cutting device to cause the cutting elements to travel with the tube during the cutting operation, and a longitudinally movable mandrel arranged interiorly of the tube and forming a solid cutting surface for the cutting elements.

9. An automatic paper can cutting device for continuous paper tube forming machines including a plurality of cutting elements arranged to engage a paper tube exteriorly thereof at spaced points around the same, means for revolving the cutting elements around the tube for cutting the latter, means for simultaneously moving the cutting elements longitudinally of the cutting device to cause the cutting elements to travel with the tube during the cutting operation, and a slidable mandrel of relatively soft material arranged within the cutting tube and forming a solid cutting surface for the cutting elements.

10. An automatic paper can cutting device for continuous paper tube forming machines including a plurality of cutting elements arranged to engage a paper tube exteriorly thereof at spaced points around the same, means for revolving the cutting elements around the tube for cutting the latter, means for simultaneously moving the cutting elements longitudinally of the cutting device to cause the cutting elements to travel with the tube during the cutting operation, a mandrel arranged interiorly of the tube to form a solid cutting surface for the cutting elements, means for slidably supporting the mandrel to permit the same to travel with the cutting elements, and means for automatically returning the slidable mandrel to its initial position when released by the cutting elements.

11. An automatic paper can cutting device for continuous paper tube forming machines having means for rotating and advancing the tube, including a rotary housing having an opening to receive a tube, cutting elements mounted in the housing and arranged to engage the tube exteriorly thereof, and means for rotating the housing to revolve the cutting elements around the tube in the direction opposite to the rotation of the tube to cut the same.

12. An automatic paper can cutting device for continuous paper tube forming machines including a rotary housing having an opening to receive a tube, cutting elements mounted in the housing and arranged to engage the tube exteriorly thereof, means for rotating the housing to revolve the cutting elements around the tube to cut the same, and means for simultaneously moving the cutting elements longitudinally of the housing to cause the cutting elements to travel with the tube.

13. An automatic paper can cutting device for continuous paper tube forming machines including a rotary housing having an opening to receive a tube directly from a tube forming machine, cutting units arranged within the housing at intervals around the tube and comprising endless sprocket chains arranged in pairs and extending longitudinally of the housing, bridges connecting the chains and provided with cutting elements arranged to engage the tube exteriorly thereof, and gearing for rotating the housing to revolve the cutting elements around the tube and for simultaneously operating the endless chains to cause the cutting elements to travel with the tube.

14. An automatic paper can cutting device for continuous paper tube forming machines including a rotary housing provided with trunnions forming an opening to receive a tube directly from a tube forming machine, cutting units arranged at intervals around the tube and comprising sprocket chains arranged in pairs and extending longitudinally of the housing, bridges connecting the chains and provided with cutting elements arranged to engage the tube exteriorly thereof, sprocket wheels meshing with and supporting the sprocket chains, transverse shafts connecting the sprocket wheels, short longitudinal shafts mounted in the housing, gearing connecting each of the longitudinal shafts with one of the transverse shafts of the cutting units, a plurality of gears fixedly mounted on the longitudinal shafts, a central gear rotatably mounted on one of the trunnions and meshing with the gears of the longitudinal shafts, and gearing connected with the other trunnion for rotating the housing and with said central gear for operating the cutting mechanism.

15. An automatic paper can cutting device for continuous paper tube forming machines including a rotary housing having an opening to receive a paper tube from a tube forming machine, cutting mechanism mounted within the housing and arranged to engage the tube exteriorly thereof for cutting the same, a shaft provided with means for connecting it with the winding mandrel of the paper forming machine, and a relatively stationary mandrel mounted on the said shaft and adapted to form a continuation of the winding mandrel and located within the housing for supporting the tube during the operation of the cutting mechanism.

16. An automatic paper can cutting device for continuous paper tube forming machines including a rotary housing having an opening to receive a paper tube from a tube forming machine, cutting mechanism mounted within the housing and arranged to engage the tube exteriorly thereof for cutting the same, a shaft provided with means for connecting it with the winding mandrel of the paper forming machine, and a slidable mandrel mounted on the shaft and arranged within the said tube to form a solid cutting surface for the cutting mechanism.

17. An automatic paper can cutting device for continuous paper tube forming machines including a rotary housing having an opening to receive a paper tube from a tube forming machine, cutting mechanism mounted within the housing and arranged to engage the tube exteriorly thereof for cutting the same, a shaft provided with means for connecting it with the winding mandrel of the paper forming machine, a relatively stationary mandrel mounted on the shaft and arranged within the said tube for supporting the same during the operation of the cutting mechanism, and a slidable mandrel also mounted on the said shaft and located within the tube to form a solid cutting surface for the cutting mechanism, said slidable mandrel being movable with the cutting mechanism and the tube.

JOSEPH BECH.